United States Patent [19]

Hsiung

[11] Patent Number: 4,924,451
[45] Date of Patent: May 8, 1990

[54] COMPUTER TIME CLOCK

[76] Inventor: Bear Hsiung, 1FL., No. 18, Lane 55, Sec. 3, Chung Shan N. Rd., Taipei, Taiwan

[21] Appl. No.: 206,084

[22] Filed: Jun. 13, 1988

[51] Int. Cl.$^5$ .................... G04B 47/00; G06K 7/10
[52] U.S. Cl. ................................. 368/10; 235/377; 364/406
[58] Field of Search .............. 368/10, 90, 107, 113; 235/377, 380; 364/406, 569; 194/207, 211, 902

[56] References Cited

U.S. PATENT DOCUMENTS 3,894,215  7/1975  Lotter et al. ..................... 235/377
4,170,015  10/1979  Elliano et al. ..................... 364/406
4,270,043  5/1981  Baxter et al. ..................... 235/377
4,333,085  6/1982  Witts ..................... 364/406

Primary Examiner—Vit W. Miska
Attorney, Agent, or Firm—Lowe, Price, LeBlanc, Becker & Shur

[57] ABSTRACT

A computer time clock, which is to use a photo-electric mechanism to decode the card and to store the data in a built-in diskette, and which provides a complementary memory for storage of the data at time the built-in diskette is overloaded, which can also provide multiple alarms for additional functional control and burglar-proof setting in the night.

2 Claims, 4 Drawing Sheets

COMPUTER TIME CLOCK

BACKGROUND OF THE INVENTION

The present invention relates to a computer time clock, which is to use a photo-electric mechanism to decode the card and to store the data in a built-in diskette, and which provides a complementary memory for storage of the data at time the built-in diskette is overloaded, which can also provide multiple alarms for additional functional control and burglar-proof setting in the night.

To appraise the diligence of the employees is one of the basic managements of a company, therefore, a time clock to record the performance of duty attendance in thus more than important. An ideal time clock is a device which can provide the advantages of low incidence of mechanism breakdown, high security (self-protection), multi-function and low cost. The existing time clocks available in the market are either conventional mechanical type, or card-punching or electronic card-reading type. The former of mechanical type time clock is exclusively for time-punching only and easy to drop down. Although the later can provide more functions, but the magnetic cards required are very expensive and too sensitive to temperature, humility and magnetic field strength to frequently drop down.

The main object of the present invention is to provide a multi-functional time clock for which the cards are easy and inexpensive to manufacture and free from environmental influences such as temperature, humility and magnetic field strength.

A yet further object of the present invention is to fully utilize the properties of a computer and a time clock so as to expand the functions of a computerized time clock. More particularly, the present invention is to use a photo-electric device to detect the chardholes arrangement of a card that inserted into the system and to decode the number of the card so as to input the data of the number of the card as well as the real time into built-in floppy disk for further transmission to CPU at time of need in appraising the diligence and pay-roll checking. With the projecting of the combination of soft-ware and hard-ware, the system can provided alarm setting, error check, auto reset and burglar alrm functions.

SUMMARY OF THE INVENTION

The present invention is to provide a computerized time clock, comprising a photo-electric card-reader, a CPU system, a memory system, a time-display system, another display system, a printer and a disk driver; by means of the photo-electric card-reader to check the card, by means of the CPU system to simultaneously memorize the number of the card and the real time, to print out the data through the printer, and also to show the data and a signal of work completion on the display, wherein all the data memorized in the disk driver system being accessible by the main computer and all the data being accessed from the disk driver system at time the system being fully occupied being arranded to store at the memory system so as to protect the data from lossing.

DETAILED DESCRIPTION OF THE PREFERRED EMBODIMENT

Figure 1:
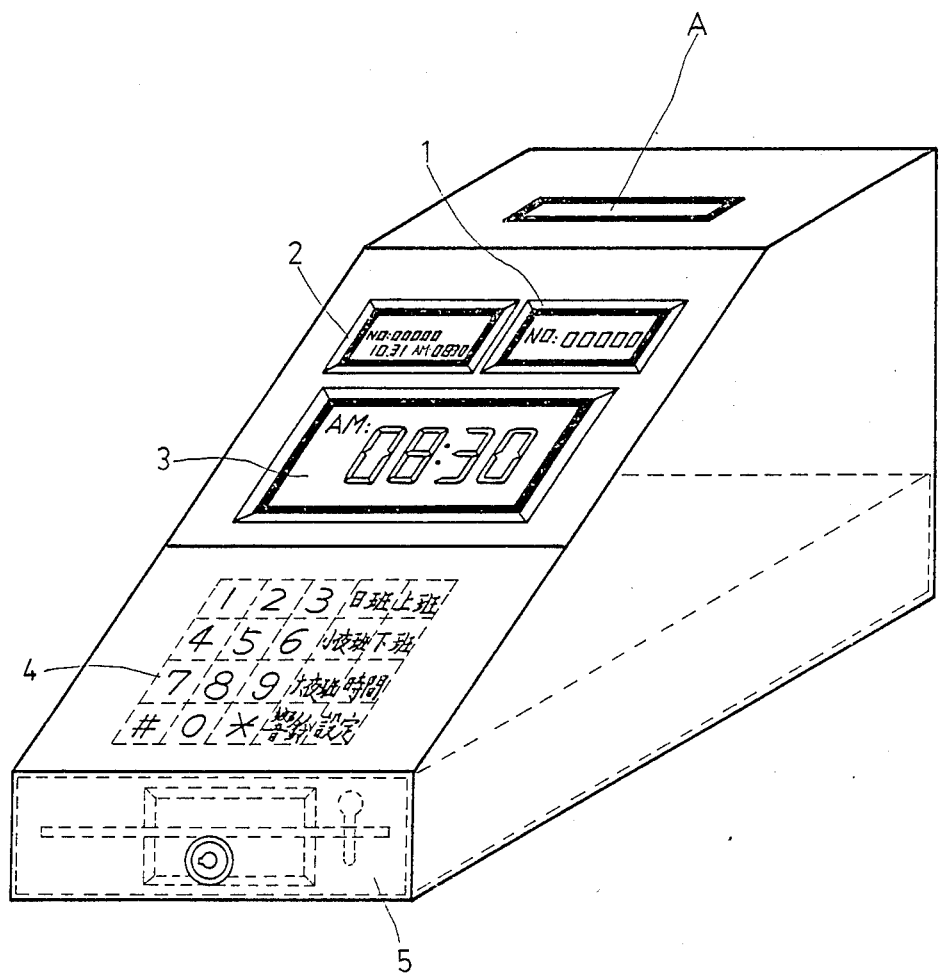
FIG. 1 illustrates a computerized time clock embodying the present invention.

Please refer to the illustration of FIG. 1, wherein the card slot A is for insertion of cards. When a card is inserted into the card slot A up to a proper depth, the card number display terminal 1 will show the number of the card for identification. If the number displayed is confirmed by the card owner, the card owner can then insert the card up to the bottom, and the built-in printer 2 will immediately print out the number of the card, the date and the time for record, and thus the card punching process is completed; time display terminal 3 is for the display of existing time and the time that set for alarm; function setting keyboard 4 is for adjusting time of duty and alarm; built-in disk driver 5 is protected by a lock.

Figure 2:
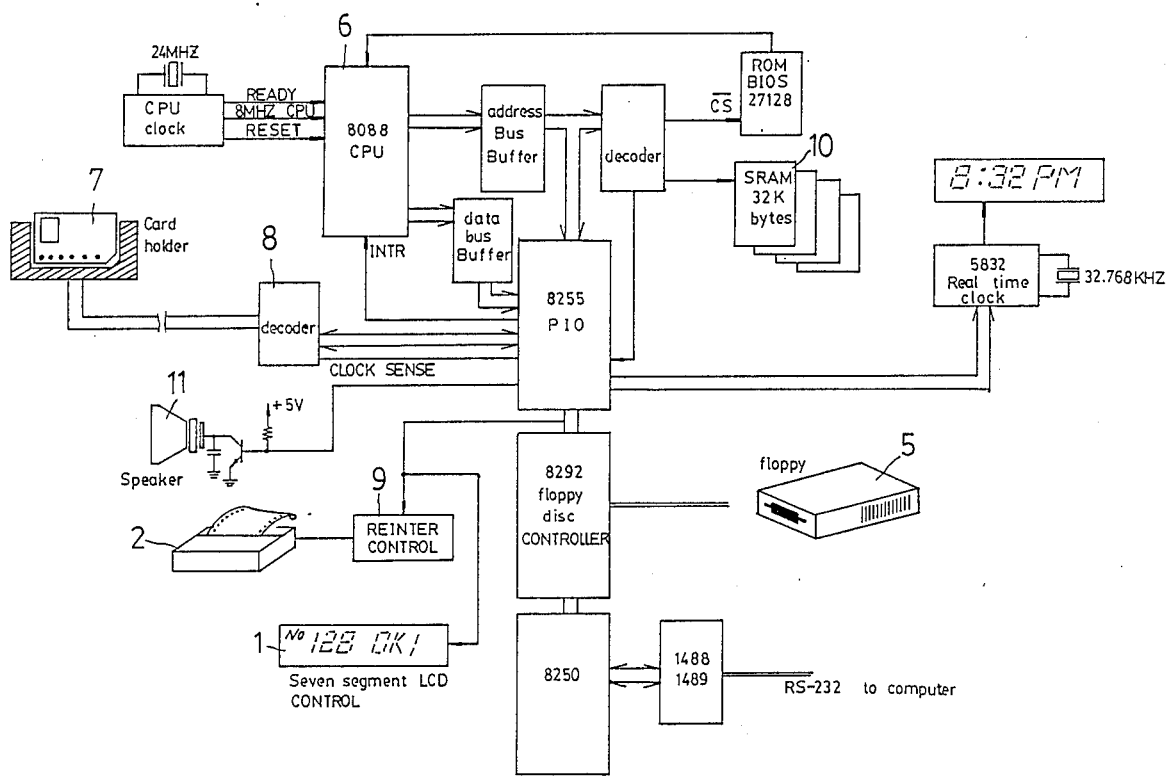
FIG. 2 is a system block diagram for the preferred embodiment according to the present invention.

Please refer to the system block diagram of the preferred embodiment as shown in FIG. 2 wherein one piece of 8088 is used for the CPU 6. When a card 7 is inserted into the card slot, the number of the card is decoded by the decoder 8 and sent to 8255 PIO and a signal for interruption is also sent to CPU; by means of the control through CPU and soft-ware, the data of the card number, the time, and the date is transmitted to the printer through printer controller 9 for print and also transmitted disk driver 5 through 8292 disk driver controller for storage, at the same time, the card number display terminal will also show "OK" to confirm the completion of punching process.

The data atored at the disk driver is accessible at a time by the main computer through interface 8250, 1488, 1489 and RS232 according to requirement. In case the space in disk is fully occupied, the CPU will control to store the data of punching in a memory 10 of the SRAM to prevent from missing. Any punching error happens or at time of goint on duty or coming off duty, the speaker 11 is then controlled by the soft-ware to provide a notice of melody or sound.

Figure 3:
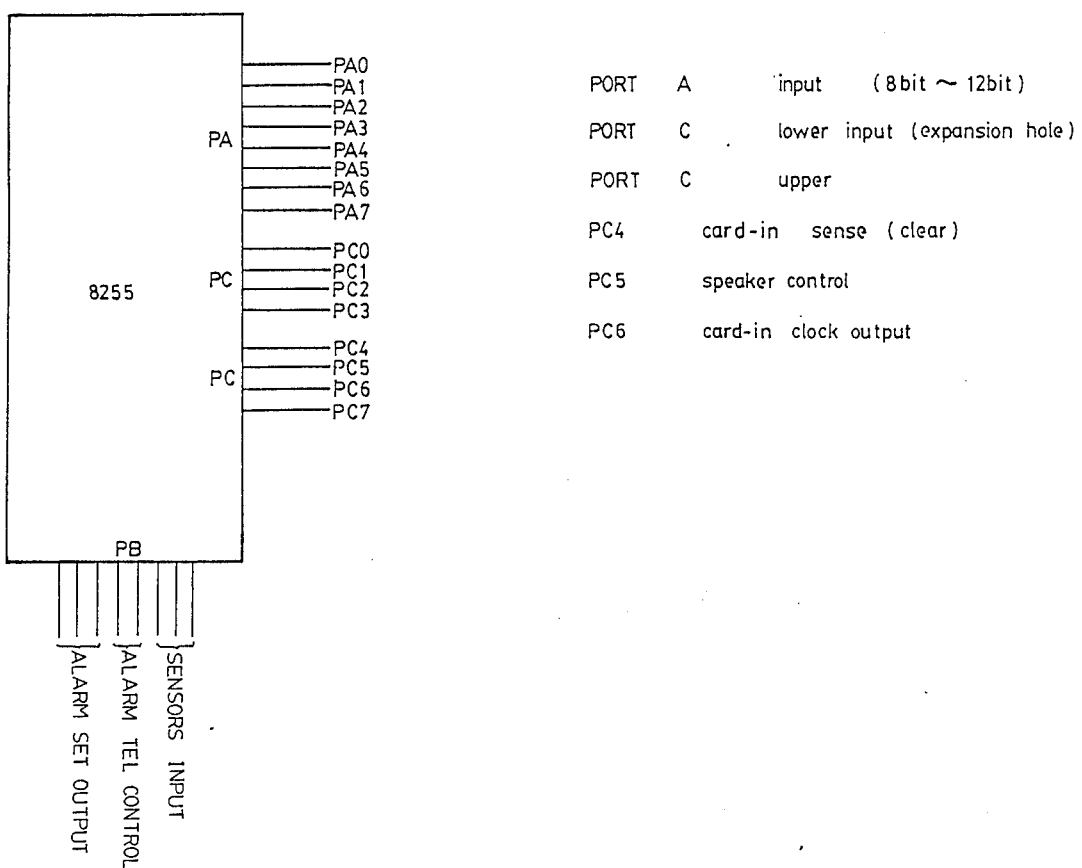
FIG. 3 illustrates the application of the plug pins of the interface control IC for thr preferred embodiment according to the present invention.

Please refer to the drawing of FIG. 3 for the description of the application of the plug pins of the interface control IC 8255. There are 12 plug pins in input port PA0-PA7 and PCO-PC3 for receiving and checking Hi and Lo signals resulted from the code holes of the card (referring to FIG. 4), i.e. is limited to a maximum of 12 code holes. The input plug pin PC4 is to receive the signal of allocation confirmation of the card. The pin PC5 is to control the specker. The pin PC6 is for clock output at time the card is allocated. The PB port is designed for special function.

When matching with a soft-ward, the function setting keyboard can be operated to provide multiple time of alarm set, when a prefixed time is reached, a specific alarm set output of the PB or will provide an output signal to control outer device. The time system of the preferred embodiment according to the present invention is equipped with a complementary battery to get free from power failure, which can automatically make a leap month calculation, can provide a sound of alarm signal at real time clock failure, and can auto reset to normal condition at time of system failure. Further-more, by means of a specially coded card to intert into the slot for punch after coming off duty, a night burglar alarm system will be initiated, burglar alarm soft-ware will scan over the pins of the sensors input in the PB port which are connected to outer alarm sensor, infra red device and switch etc.; if any input signal is sensed over the pins of sensors input, the soft-ware will automatically provide an output signal through the Alarm, Tel. Control of the PB port to turn on the alarm device and to automatically dial the telephone for alarm notice; at time going on duty in the morning, the specifically coded card can then be put into the slot for punching again to cancel the function of burglar alarm system and to turn the computerized time clock to normal function.

Figure 4:
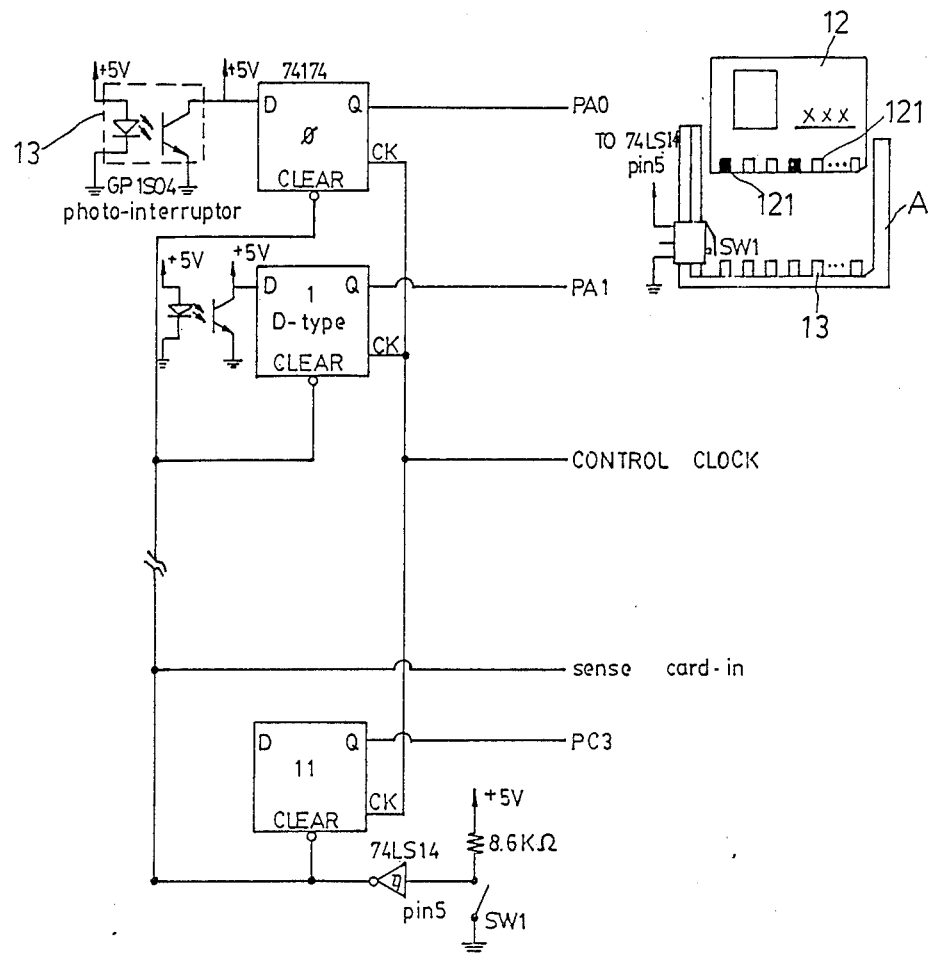
FIG. 4 is a circuit diagram for the photo-electric card-reader of the preferred embodiment according to the present invention.

The structure of the photo-electric card-reader according to the present invention is as shown in FIG. 4. The card 12 according to the present invention comprises 12 code holes 121 which have beem sealed when delivered from the factory and are to be selectively perforated by the user according to his coding system (the black parts in the drawing represent been perforated). The arrangement of the code holes 121 are designed for easy perforating by the user in coding. Photoelectric detectors 13 are arranged at the bottom of the card slot A in position corresponding to the code holes 121 of the card. When a card is inserted into the card slot A, the unperforated code hole will interrupt the corresponding photo-electric detector and the interrupted photo-electric detector will provide a +5 V Hi signal to the pin "D" of the IC 74174, and the pin "Q" of the IC 74174 will then provide a Hi signal to the corresponding pin among PA0–PC3 of the interface IC 8255; on the contrary, the corresponding pin of the interface IC 8255 will receive Lo signal. Thus, card reading process is proceeded. A yet further arrangement of a switch (sw1) is allocated at a proper position in the card slot A, when a card is properly inserted into the slot A, the switch will be initiated to provide a signal of confirmation to drive the speaker to sound so as to let the system start card reading process.

I claim:

1. A computer time clock comprising a photo-electric card-reader system including a card slot, a CPU system, a memory system, a time display system, a display system, a printer system, and a disk driver system; means coupled to said time display system for displaying the card number read by the card-reader and the existing time when a card is checked by said card-reader, said means being controlled by the CPU to store into the disk driver system and to print out through the printer while being displayed by the display system; means for making the data stored at the disk driver system accessible by the main computer, and means when the disk driver system is fully occupied for storing data obtained by said card reader at the memory system to prevent data loss and means for providing a burglar alarms function wherein a specifically coded card inserted into the card slot activates an interface scanning to check burglar alarm detectors and if the burgular detectors have been triggered to activate a burglar alarm and a pre-set telephone to respectively provide alarm signals.

2. The computer time clock of claim 1 wherein the photo-electric card-reader system comprises a plurality of photo-electric detectors being arranged at the bottom of said card slot, said detectors adapted to match selectively perforated corresponding code holes at the bottom edge of a card to be read in proper numbers and position when a card is properly inserted into the card slot, a switch arranged in the slot being initiated to drive the system to start reading the card so that unperforated code holes interrupt the corresponding photo-electric detectors to provide signals contrary to the signals provide by the perforated code holes so as to complete the card-reading process.

* * * * *